United States Patent
Chintakunta et al.

(10) Patent No.: US 12,190,080 B2
(45) Date of Patent: Jan. 7, 2025

(54) AUTOMATIC GENERATION OF USER EXPERIENCE MOCKUPS USING ADAPTIVE GAZE TRACKING

(71) Applicant: Kyndryl, Inc., New York, NY (US)

(72) Inventors: Mouleswara Reddy Chintakunta, Allagadda (IN); Omar Odibat, Cedar Park, TX (US); Pritpal S. Arora, Bangalore (IN)

(73) Assignee: Kyndryl, Inc., New York, NY (US)

( * ) Notice: Subject to any disclaimer, the term of this patent is extended or adjusted under 35 U.S.C. 154(b) by 331 days.

(21) Appl. No.: 17/884,616

(22) Filed: Aug. 10, 2022

(65) Prior Publication Data

US 2024/0053964 A1 Feb. 15, 2024

(51) Int. Cl.
*G06F 3/01* (2006.01)
*G06F 8/20* (2018.01)
*G06F 40/279* (2020.01)

(52) U.S. Cl.
CPC ............... *G06F 8/20* (2013.01); *G06F 3/013* (2013.01); *G06F 40/279* (2020.01)

(58) Field of Classification Search
None
See application file for complete search history.

(56) References Cited

U.S. PATENT DOCUMENTS

| | | | |
|---|---|---|---|
| 10,347,248 B2 | 7/2019 | Kennewick et al. | |
| 10,387,173 B1 | 8/2019 | Paulus et al. | |
| 10,733,754 B2* | 8/2020 | Dayanandan | G06F 8/35 |
| 2013/0166394 A1* | 6/2013 | Churchill | G06Q 30/0276 706/12 |
| 2019/0304157 A1* | 10/2019 | Amer | G06V 40/23 |

(Continued)

FOREIGN PATENT DOCUMENTS

| | | |
|---|---|---|
| WO | 2019191810 A1 | 10/2019 |
| WO | 2020264053 A1 | 12/2020 |

OTHER PUBLICATIONS

Earnshaw, Y., Tawfik, A. A., & Schmidt, M. "User Experience Design. Foundations of Learning and Instructional Design Technology : Historical Roots and Current Trends", 2018, edtechbooks. org, pp. 369-390. (Year: 2018).*

(Continued)

*Primary Examiner* — Ariel Mercado-Vargas
(74) *Attorney, Agent, or Firm* — CANTOR COLBURN LLP; Erik Swanson

(57) ABSTRACT

A user experience theme description is obtained, along with a new user experience feature image set. The theme description and new user experience feature image set are input into a generative adversarial network (GAN). The GAN is trained to output multiple user experience designs based on the new feature image set. The multiple designs are displayed on an electronic display device that includes an eye gaze tracking system. User interface elements and their corresponding positions within a user interface are identified based on eye gaze of a user towards the electronic display device. The position and type of user interface elements are compared between a desired user interface design and a generated user interface design. Errors between the desired user interface design and the generated user interface design are input as feedback into the GAN to further enhance the results.

20 Claims, 9 Drawing Sheets

(56) References Cited

U.S. PATENT DOCUMENTS

| | | | |
|---|---|---|---|
| 2019/0317739 A1* | 10/2019 | Turek | G06N 3/045 |
| 2021/0019468 A1 | 1/2021 | Souche et al. | |
| 2021/0034339 A1* | 2/2021 | Romero | G06N 5/04 |
| 2022/0004809 A1 | 1/2022 | Iyer et al. | |
| 2022/0075477 A1* | 3/2022 | Sobolev | G06F 3/0488 |
| 2022/0139072 A1* | 5/2022 | Klaiman | G06N 3/045 |
| | | | 382/159 |
| 2023/0139626 A1* | 5/2023 | Berliner | G06F 1/1694 |
| | | | 345/156 |
| 2023/0386289 A1* | 11/2023 | Perrow | G07F 17/3209 |

OTHER PUBLICATIONS

Huang, Forrest et al. "Creating User Interface Mock-ups from High-Level Text Descriptions with Deep-Learning Models", 2021, ArXiv abs/2110.07775, pp. 1-20. (Year: 2021).*

Pfeiffer, Andreas, "Creativity and Technology in the Age of AI", http://www.pfeifferreport.com/essays/creativity-and-technology-in-the-age-of-ai/, Nov. 20, 2018, 3 pgs.

Karnaukh, Rina, "Average Time to Build a Website from Scratch in 2022 [Detailed Explanation]", https://onix-systems.com/blog/how-long-does-it-take-to-make-a-website, May 10, 2021, 28 pgs.

Hussain et al., "A Multimodal Deep Log-Based User Experience (UX) Platform for UX Evaluation", www.mdpi.com/journal/sensors, Sensors 2018, 31 pgs.

Zhao et al., "GUIGAN: Learning to Generate GUI Designs Using Generative Adversarial Networks", Jan. 27, 2021, 13 pgs.

* cited by examiner

AUTOMATIC GENERATION OF USER EXPERIENCE MOCKUPS USING ADAPTIVE GAZE TRACKING

FIELD

The present invention relates generally to computer application user interface design, and more particularly, to automated user experience mockup generation.

BACKGROUND

In complex, enterprise-level computer systems, the user experience (UX), plays a key role in the overall success of such systems, and the organizations that support and maintain those systems. The usability of a product's design is a measure of how easily users can complete tasks effectively and efficiently. A good UX requires good usability. However, usability is just one attribute of good UX. Usability helps enable well-functioning products, but the fact that a product is easy to use doesn't guarantee that people will use it. Furthermore, the UX is typically not static. It can change over time. The UX design of a product will evolve as feedback is received from end-users.

The UX can include the architecture of features, as well as details regarding the screens, steps, flows, layouts, processes, organization, and menus. UX design involves ideas, data, and awareness of customer pain points. UX teams can cycle through the tasks in its user-centered design process and then tests these concepts before engineering implements backend support. This ensures that the product or features being implemented are correct, prior to investing large amounts of time and money in building backend support for the features. Testing on mockups, which can include wireframes, slides, or basic HTML pages, can help UX designers evaluate the user interfaces, and select the best user interface to implement the feature, prior to getting engineering/development involved.

Well-designed UX is essential to the success of products and businesses, and UX designers are an integral part of the process. By creating a UX that provides a user interface that is useful, usable, and intuitive, they can help create loyal customers, improving the popularity and revenue generation of computer applications.

SUMMARY

In one embodiment, there is provided a computer-implemented method for automated user experience mockup generation, comprising: obtaining a user experience theme description; obtaining a new feature image set; generating a plurality of user experience designs corresponding to the new feature image set by performing an iterative process using a generative adversarial network (GAN) based on the theme description and the new feature image set; tracking an eye gaze of a user with respect to a display of the plurality of user experience designs on an electronic display device; identifying a set of user interface elements based on the eye gaze; comparing the set of user interface elements in at least two user experience designs from the plurality of user experience designs that are identified based on the eye gaze; and returning the one or more user interface elements that were identified based on the eye gaze as feedback input to the GAN.

In another embodiment, there is provided an electronic computation device comprising: a processor; a memory coupled to the processor, the memory containing instructions, that when executed by the processor, cause the electronic computation device to: obtain a user experience theme description; obtain a new feature image set; generate a plurality of user experience designs corresponding to the new feature image set by performing an iterative process using a generative adversarial network (GAN) based on the theme description and the new feature image set; track an eye gaze of a user with respect to a display of the plurality of user experience designs on an electronic display device; identify a set of user interface elements based on the eye gaze; compare the set of user interface elements in at least two user experience designs from the plurality of user experience designs that are identified based on the eye gaze; and return the one or more user interface elements that were identified based on the eye gaze as feedback input to the GAN.

In another embodiment, there is provided a computer program product for an electronic computation device comprising a computer readable storage medium having program instructions embodied therewith, the program instructions executable by a processor to cause the electronic computation device to: obtain a user experience theme description; obtain a new feature image set; generate a plurality of user experience designs corresponding to the new feature image set by performing an iterative process using a generative adversarial network (GAN) based on the theme description and the new feature image set; track an eye gaze of a user with respect to a display of the plurality of user experience designs on an electronic display device; identify a set of user interface elements based on the eye gaze; compare the set of user interface elements in at least two user experience designs from the plurality of user experience designs that are identified based on the eye gaze; and return the one or more user interface elements that were identified based on the eye gaze as feedback input to the GAN.

Figure 1:
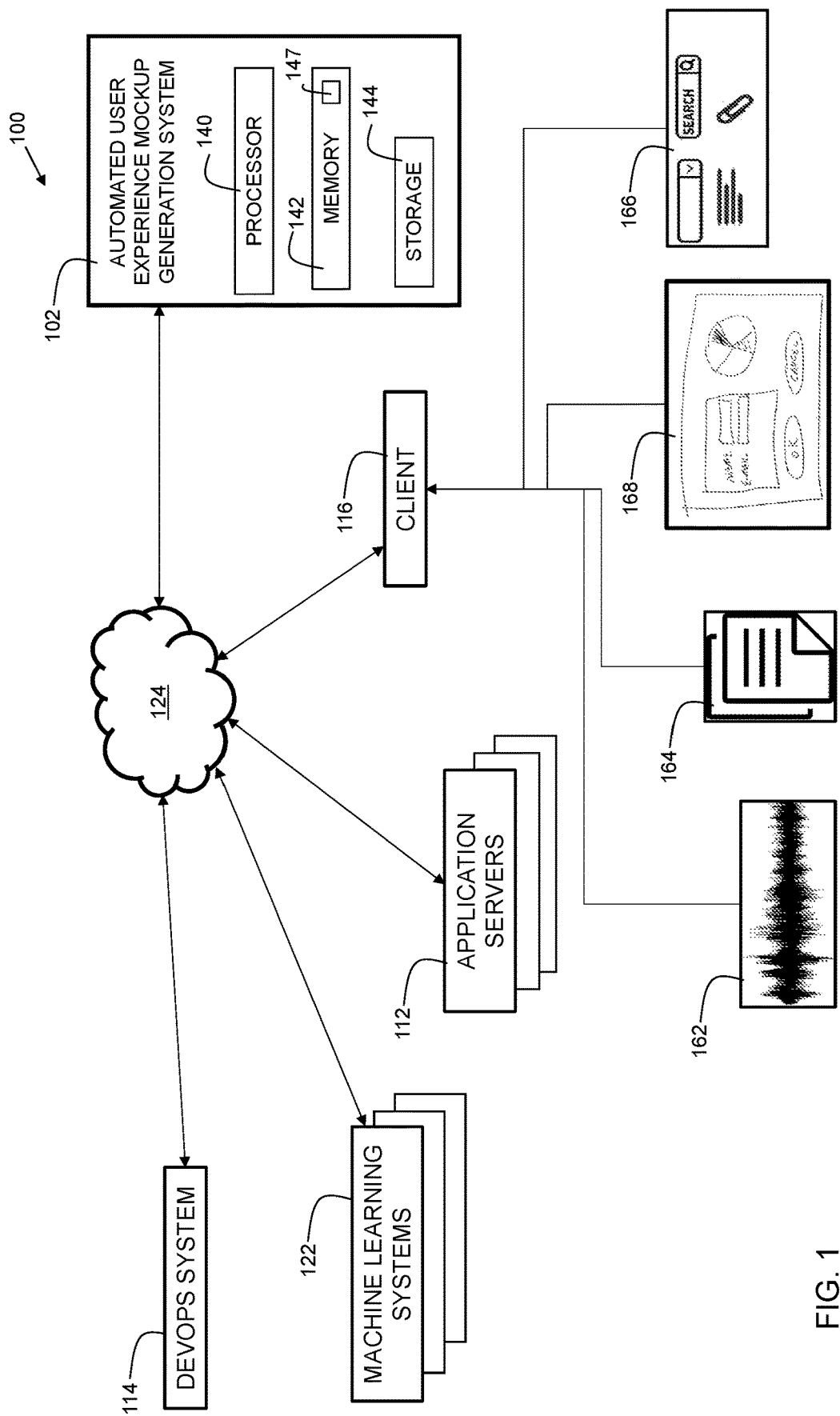
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

When product management or other stakeholders try to implement a new feature into an existing user interface, the current user experience (UX) process requires many stages and many iterations of interaction between resources and management before the first prototype can be generated, reviewed and validated with required functionalities.

The typical UX development process can include structured or unstructured input data, such as images and audio. A research and analysis phase, followed by creation of layouts, prototyping of user interfaces, and design validation can consume many man-hours and resources. As such, adding a new feature to a user interface (UI) can be a very time-consuming process.

Aspects of the present invention generally relate to an adaptive gaze enabled intelligent system and method for UX mockups (AGEIUXM) that utilize computer-implemented techniques for automated user experience mockup generation. This can greatly shorten the development time for a new feature for a user interface. In embodiments, a user experience theme description is obtained, along with a new user experience feature image set. The theme description and new user experience feature image set are input into a generative adversarial network (GAN). The GAN is trained to output multiple user experience designs based on the new feature image set and the theme description. The multiple designs are displayed on an electronic display device that includes an eye gaze tracking system. User interface/user experience elements and their corresponding positions within a user interface are identified based on eye gaze of a user towards the electronic display device. The position and type of user interface elements are compared between a desired user interface design and a generated user interface design. Errors between the desired user interface design and the generated user interface design are input as feedback into the GAN to further enhance the results.

Disclosed embodiments can be used to generate multiple designs for a UX feature, considering the theme of an existing user interface, and assist in evaluation of the UX features with a gaze-based feedback generation system, which assists in comparing of UX elements. The generated UX designs that are selected as being closest to a finalized UX design can be used as training data for the machine learning systems used in disclosed embodiments. This enables the machine learning systems to improve the output over time, producing better computer-generated UX mockups.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is an environment 100 for embodiments of the present invention.

Automated User Experience Mockup System (AUEMGS) 102 comprises a processor 140, a memory 142 coupled to the processor 140, and storage 144. System 102 is an electronic computation device. The memory 142 contains program instructions 147, that when executed by the processor 140, perform processes, techniques, and implementations of disclosed embodiments. Memory 142 may include dynamic random-access memory (DRAM), static random-access memory (SRAM), magnetic storage, and/or a read only memory such as flash, EEPROM, optical storage, or other suitable memory, and should not be construed as being a transitory signal per se. In some embodiments, storage 144 may include one or more magnetic storage devices such as hard disk drives (HDDs). Storage 144 may additionally include one or more solid state drives (SSDs). The AUEMGS 102 is configured to interact with other elements of environment 100. AUEMGS 102 is connected to network 124, which can include the Internet, a wide area network, a local area network, and/or other suitable network.

Environment 100 may include one or more client devices, indicated as 116. Client device 116 can include a laptop computer, desktop computer, tablet computer, smartphone, or other suitable computing device. Client device 116 may be used to configure AUEMGS 102.

Environment 100 may include one or more machine learning systems 122. The machine learning systems 122 can include, but are not limited to, a convolutional neural network (CNN), generative adversarial network (GAN), Recurrent Neural Network (RNN), Long Short Term Memory Network (LSTM), Radial Basis Function Network (RBFN), Multilayer Perceptron (MLP), and/or other suitable neural network types. In some embodiments, the AUEMGS 102 may orchestrate training and inputting data and receiving of output data from the machine learning systems 122. In some embodiments, one or more of the aforementioned networks may be implemented with the AUEMGS 102.

Environment 100 may include one or more application servers 112. The application servers 112 may include cloud-based servers that implement HTML-based user interfaces and provide backend functionality to support features and functions such as e-commerce, banking, reservations, and/or financial applications, to name a few.

Environment 100 may include a DevOps system 114. The DevOps system 114 can include a continuous integration system such as Jenkins, a code collaboration tool such as Gerrit, and/or a code distribution tool to push upgrades to deployed applications that are executing on the one or more application servers 112.

Client device 116 may receive data of various types that can be input to the AUEMGS 102 to enable rapid-generation of user interfaces. The data can include audio data 162, text data 164, hand-drawn sketches 168, and/or computer-rendered visual user interface data 166. The audio data 162 may be stored as a WAV file, MP3 file, or other suitable format. The text data 164 may be represented as ASCII data, Unicode data, UTF-8 data, or other suitable format. The sketches 168 may be represented as bitmap files, JPEG files, PNG files, or other suitable format.

As an example, a UX team may wish to add a screen to an existing user interface to support a new feature. The UX team may have a meeting to discuss the new feature, and the audio of that meeting may be recorded as audio data 162. The meeting can be a designer meeting that includes multiple UX designers. The meeting can be a status meeting, brainstorming session, and/or other meeting in which a user experience is being discussed. The audio data 162 can include an audio recording of a designer meeting where a UX design team is discussing proposals for a new UX feature and/or UX design. Text in the form of requirements, user stories, test plans, and other information may be included in text data 164. Visual user interface data 166 can include thematic data. The thematic data can describe a user interface theme. The user interface theme can include the shapes, positioning, and colors of user interface elements such as buttons, text fields, list boxes, and other user interfaces. The thematic data may include images and/or descriptions such as XML data. The thematic data images can include button shapes, colors, and other user interface/user experience elements. User experience elements can include various widgets and controls, including, but not limited to, text entry fields, radio buttons, checkboxes, dropdown lists, menus, icons, buttons, tooltips, file upload drag-and-drop regions, and/or other user interface components now known, or hereinafter developed.

The client device 116 can import the audio data 162, text data 164, user interface data 166, and/or sketches 168 to the AUEMGS 102. The AUEMGS 102 can perform a speech-to-text process on the audio data 162 to generate a transcript. The AUEMGS 102 can perform natural language processing (NLP) on the transcript to perform disambiguation, entity detection, sentiment analysis, and/or other language analysis to extract keywords and concepts from the transcript that pertain to the new feature. The AUEMGS 102 can perform natural language processing (NLP) on the text data 164 to perform disambiguation, entity detection, sentiment analysis, and/or other language analysis to extract keywords and concepts from the text data that pertain to the new feature. In embodiments, the NLP processing can include, but is not limited to, indexing, concordance, stop word processing, bigram processing, dispersion analysis, lexical richness analysis (ratio of distinct words to total words), disambiguation, part-of-speech analysis, and/or anaphora resolution (the process of identifying what a pronoun or noun phrase refers to). The NLP process may utilize one or more classifiers. The classifiers may include, but are not limited to, decision trees, naive Bayes classifiers, Maximum Entropy classifiers, decision trees, and/or support vector machine classifiers. Thus, some embodiments include performing a computerized natural language analysis process by using a naïve Bayes classifier. Some embodiments include performing a computerized natural language analysis process by using a support vector machine classifier.

The AUEMGS 102 can input the obtained keywords, concepts, images, and topics to one or more of the machine learning systems 122. The machine learning systems can include a generative adversarial network (GAN). A generative adversarial network (GAN) includes two main components; a generator, and a discriminator. The generator is a neural network that learns to generate plausible data. The generated instances are input to a discriminator. The discriminator is a neural network that learns to distinguish the generator's fake data from real data. The discriminator penalizes the generator for generating implausible results. During the training process, the output of the generator improves, while the discriminator has less success distinguishing real output from fake output. In a GAN, the output of the generator can be connected to the input of the discriminator. Embodiments may utilize backpropagation to create a signal that the generator neural network uses to update its weights.

The discriminator may utilize training data coming from two sources, real data, which can include images of real objects (such as user interface screens from existing software applications), and fake data, which are images created by the generator. The discriminator uses the fake data as negative examples during the training process. A discriminator loss function is used to update weights via backpropagation for discriminator loss when it misclassifies an image.

The generator learns to create fake data by incorporating feedback from the discriminator. Basically, the generator has a learning goal to 'trick' the discriminator into classifying its output as real. A generator loss function is used to penalize the generator for failing to trick the discriminator. In embodiments, the generative adversarial network (GAN) includes two separately trained networks. In embodiments, the discriminator neural network is trained first, followed by training the generative neural network, until a desired level of convergence is achieved. The output of the GAN includes one or more UX mockups, which can be evaluated by human users and/or automated techniques. The results of the evaluations can be fed back into the GAN to further refine the results. Once fully trained, the GAN can output UX mockups for a feature, potentially saving a great amount of time and design iterations over conventional user interface design techniques. In some embodiments, one or more output UX mockups are evaluated and ranked by an automated computer-implemented process, and the UX mockup with the highest rank is automatically deployed to one or more application servers as a user interface, via DevOps system 114. Thus, embodiments can include ranking the plurality of user experience designs; identifying a user experience design from the plurality of user experience designs as having the highest rank; and selecting the identified user experience design as a starting point for creating a finalized UX design.

Figure 2:
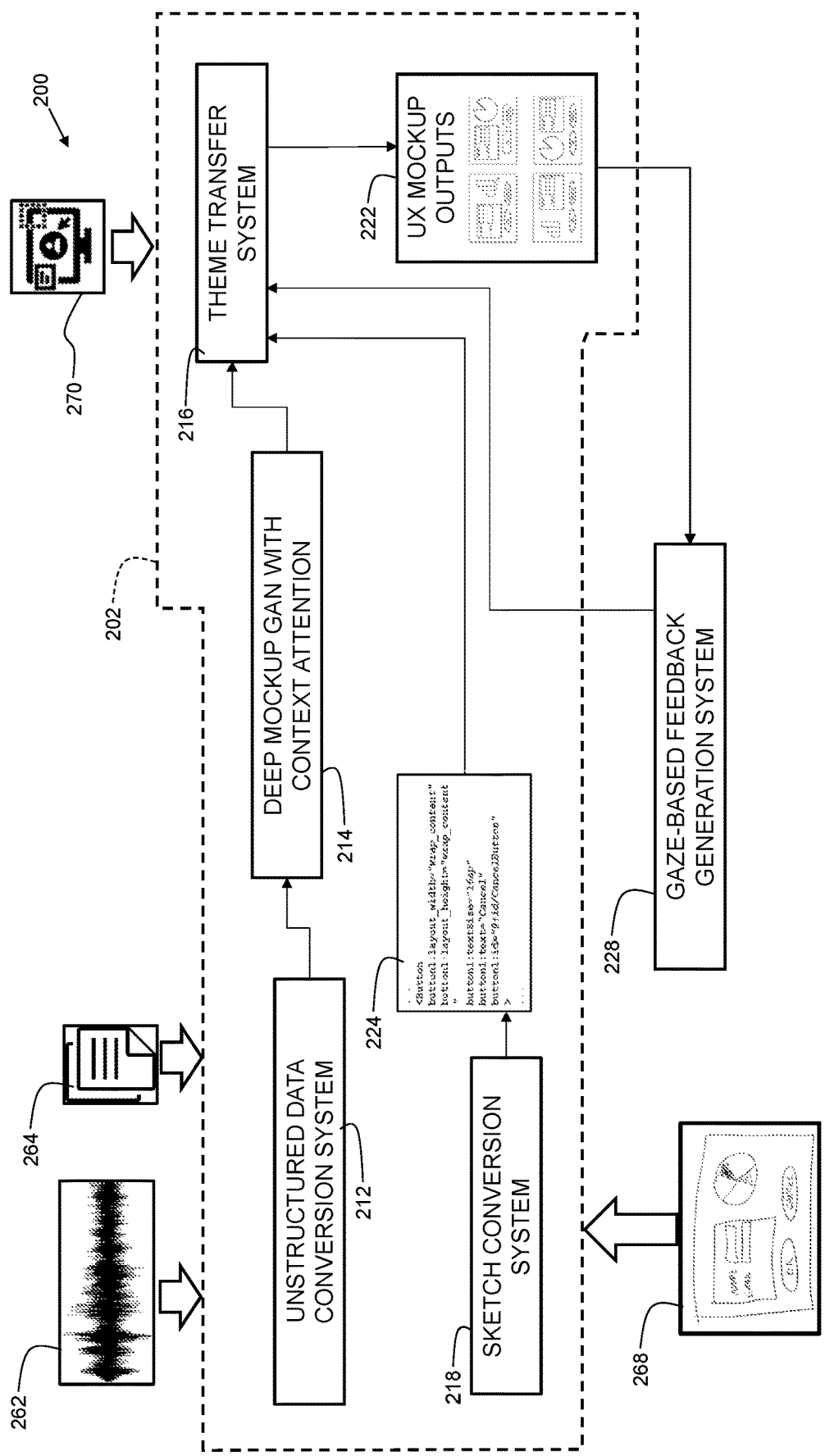
FIG. 2 is a flow diagram showing additional details of embodiments of the present invention.

FIG. 2 is a flow diagram 200 showing additional details of embodiments of the present invention. The AUEMGS is indicated as 202, with various systems within the AUEMGS shown. An unstructured data conversion system 212 receives unstructured data such as audio data 262 and text data 264. The audio data 262 may be stored as a WAV file, MP3 file, or other suitable format. The text data 264 may be represented as ASCII data, Unicode data, UTF-8 data, or other suitable format. The unstructured data conversion system converts audio data to text via a speech-to-text process. The text is then used as input to a natural language processing (NLP) process, which performs disambiguation, entity detection, and/or other linguistic techniques to extract meanings that can be used for input to the GAN. As an example, the audio data 262 can be a recording of a design meeting. During that meeting, a person may speak the phrase "We need a dialog box in the upper right corner." The unstructured data conversion system can identify terms such as 'dialog box' and 'upper right corner' and provide those terms to the GAN 214 via words and/or synthesizing an image with a dialog box in the upper right corner as input to the GAN.

The text data 264 can describe a user experience and/or user interface feature. The text data 264 can include a product requirements specification. The unstructured data conversion system may perform sentence classification on the product requirements specification. The sentence classification can include identification of sentences, based on lexical patterns and/or punctuation. The sentences can then be classified into a variety of categories. In embodiments, one of the categories can be an obligation. The obligation may be identified by various words, lemmas, and/or phrases, including, but not limited to, "shall," "must," "have to," and/or "required." In embodiments, one of the categories can be a permission. The permission may be identified by various words, lemmas, and/or phrases, including, but not limited to, "may," "allowed to," "able to," and/or "permissible." In embodiments, one of the categories can be a prohibition. The prohibition may be identified by various words, lemmas, and/or phrases, including, but not limited to, "may not," "cannot," "shall not," and/or "prohibited." In embodiments, one of the categories can be a definition. The definition may be identified by various words, lemmas, and/or phrases, including, but not limited to, "referred to as," "known as," "is a," and/or "defined as." In embodiments, one of the categories can be a consequence. The consequence may be identified by various words, lemmas, and/or phrases, including, but not limited to, "causes," "results in," "triggers," and/or "outcome." In embodiments, one of the categories can be a condition. The condition may be identified by various words, lemmas, and/or phrases, including, but not limited to, an "if-then" construct, "in order to," and/or "prerequisite." This sentence analysis can then be used as part of creating UX mockups that satisfy criteria detected from the text data 264.

The GAN 214 can be a deep mockup GAN with context attention. The GAN can include a conditional augmentation module from Z-latent space, an LSTM cell as part of its processing pipeline, word vectors, and/or other elements. The output of the GAN 214 is input to theme transfer system 216.

The theme transfer system 216 can be implemented as a GAN, neural network, and/or other machine learning system. The theme transfer system 216 can receive a theme description 270 as one of its inputs. In embodiments, the theme description 270 includes a button shape. The theme description 270 can include images and/or data files that describe theme attributes. The theme transfer system 216 can include pretrained neural networks, and utilize a gram matrix for correlation detection, including matching of content as well as matching of theme. The theme can include rules and guidelines for user interface elements. The theme can include rules on text color, text size, text font, button shape, button size, background colors, placement of user interface elements, and/or other user experience attributes associated with a user interface. As an example, a designer may create a user interface for a new feature. The created user interface can include oval-shaped buttons. However, if that feature is to be added to an existing application that uses square buttons, then the theme features can override the features of the created user interface, resulting in a computer-generated user experience mockup that more closely matches the other screens of the existing application. Thus, disclosed embodiments can improve the technical field of user interface design by accelerating integration of new features into an existing application.

Embodiments can include obtaining an audio recording of a designer meeting; performing speech-to-text on the audio recording to generate a transcript; performing natural language processing on the transcript to generate user experience attributes. The returning the one or more user interface elements is based on inputting the user experience attributes into the GAN. Embodiments can include obtaining a text document describing a user experience feature; performing natural language processing on the text document to generate one or more user experience attributes. The returning the one or more user interface elements is based on inputting the one or more user experience attributes into the GAN.

Inputs to the theme transfer system 216 can further include a hand-drawn image 268. The hand-drawn image can include a rendering of a proposed user interface screen. The hand-drawn image 268 is input to a sketch conversion system 218. The sketch conversion system 218 may utilize pattern recognition, including image classifiers, Hough transforms, sharpening kernels, Haar Cascade classifiers, and/or other techniques to identify shapes and/or other user interface elements. In embodiments, the new feature image set is obtained by: obtaining a hand-drawn image set; and converting the hand-drawn image set to an XML file, indicated as 224.

The output of the theme transfer system 216 includes one or more UX mockup outputs 222. The one or more UX mockup outputs 222 are input to a gaze-based feedback generation system 228. The gaze-based feedback generation system 228 can include an electronic display. The electronic display can render the one or more UX mockup outputs 222. The gaze-based feedback generation system 228 further includes one or more sensors. The sensors can include image sensors, cameras, infrared cameras, motion sensors, and/or other suitable sensors for determining eye gaze direction of a user, and further, inferring an area of the electronic display at which a user is looking. A user views the UX mockups on the electronic display while his/her eyes are tracked to determine where on the electronic display, the user is viewing. In embodiments, the UX mockup elements that are gazed at for a duration exceeding a predetermined threshold are identified and compared with the original desired input images derived from hand-drawn image 268. The UX mockup elements that are identified can be compared with designer UX mockups made by a user. The UX elements can be compared based on user element type and/or position. As an example, if a designer-created user interface has a pie chart on the right side of the user interface, and the computer-generated UX mockup has a pie chart on the right side of the user interface, then there is a match of both element type and element position. If instead, a designer-created user interface has a pie chart on the right side of the user interface, and the computer-generated UX mockup has a pie chart on the left side of the user interface, then there is a match of element type, but a mismatch of element position. If instead, a designer-created user interface has a pie chart on the right side of the user interface, and the computer-generated UX mockup has a bar chart, then there is a mismatch of element type. In embodiments, the UX mockups can be ranked based on how closely they match the design input. In some instances, the generated UX mockups may show a combination that the designers may prefer over the design that was originally created. In this way, disclosed embodiments can enhance the user interface design capabilities of a user experience design team.

Figure 3:
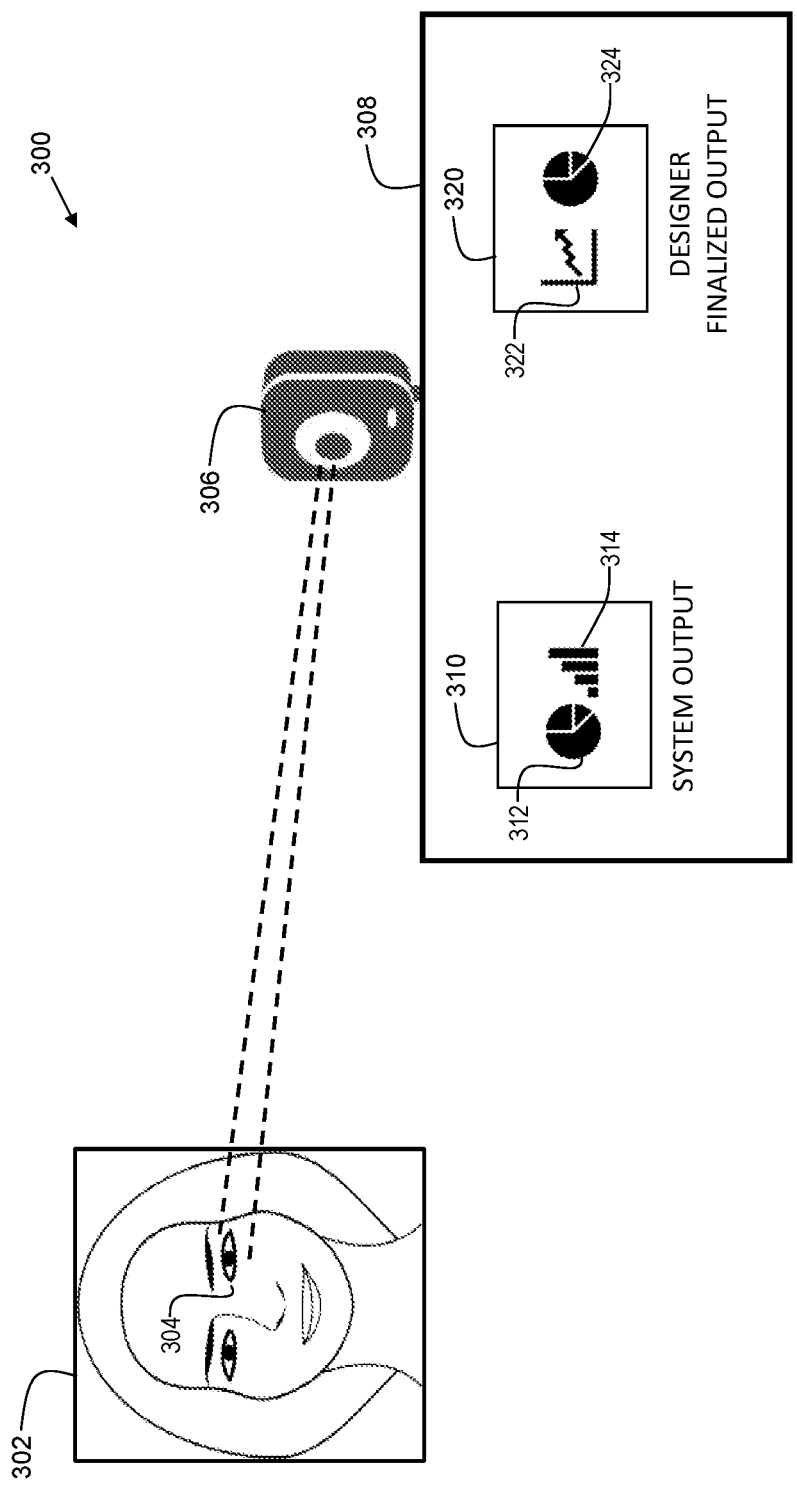
FIG. 3 illustrates portions of a gaze-based feedback generation system in accordance with embodiments of the present invention.

FIG. 3 illustrates portions of a gaze-based feedback generation system 300. An electronic display 308 can render one or more UX mockups. As shown in FIG. 3, a first UX mockup 310 and a second UX mockup 320 are shown simultaneously. A user 302 views the UX mockups 310 and 320 on the electronic display 308. A user-facing camera 306 captures images of the eyes 304 of the user, and determines eye gaze direction. Based on the determined eye gaze direction, the gaze-based feedback generation system 300 determines which UX elements are being viewed. UX mockup 310 has a first UX element 312, which is a pie chart, and a second UX element 314 which is a bar graph. UX mockup 320 has a first UX element 322, which is a line graph, and a second UX element 324 which is a pie chart.

UX mockup 320 is a designer finalized output, selected by a UX designer, while UX mockup 310 is computer-generated by the AUEMGS 102. When the user 302 gazes at UX element 312, it is identified as a pie chart on the left side of UX mockup 310. Similarly, when the user 302 gazes at UX element 322, it is identified as a pie chart on the right side of UX mockup 320. Disclosed embodiments may then determine a position error based on the determination that the UX element is correct (pie chart), but the location is incorrect (displayed on the left side instead of the right side) in UX mockup 310. The position error can be fed back into the AUEMGS 102 for further training machine learning systems 122, to improve accuracy of the UX mockup outputs over time.

The gaze-based feedback generation system 300 greatly assists in the comparison of UX mockups. System 300 determines, based on a gaze direction, a region of the display 308 that is being viewed. One or more UX elements within the viewed region are identified. A region of the UX shown on the display is also identified. As the user gazes at different parts of the various UX mockups that are rendered (either sequentially, or concurrently) on electronic display 308, the system 300 automates the comparison of UX elements, identifying cases where the correct UX element is used, but at an incorrect location, and/or cases where an incorrect UX element is used.

Embodiments can include tracking eye gaze of a user towards the electronic display device; identifying one or more user interface elements based on the eye gaze; and using the one or more user interface elements that were identified based on the eye gaze as feedback input to the GAN. In embodiments, this can include using the type and/or location of the one or more user interface elements. In embodiments, the eye gaze tracking is performed using a camera coupled to the electronic display.

Figure 4:
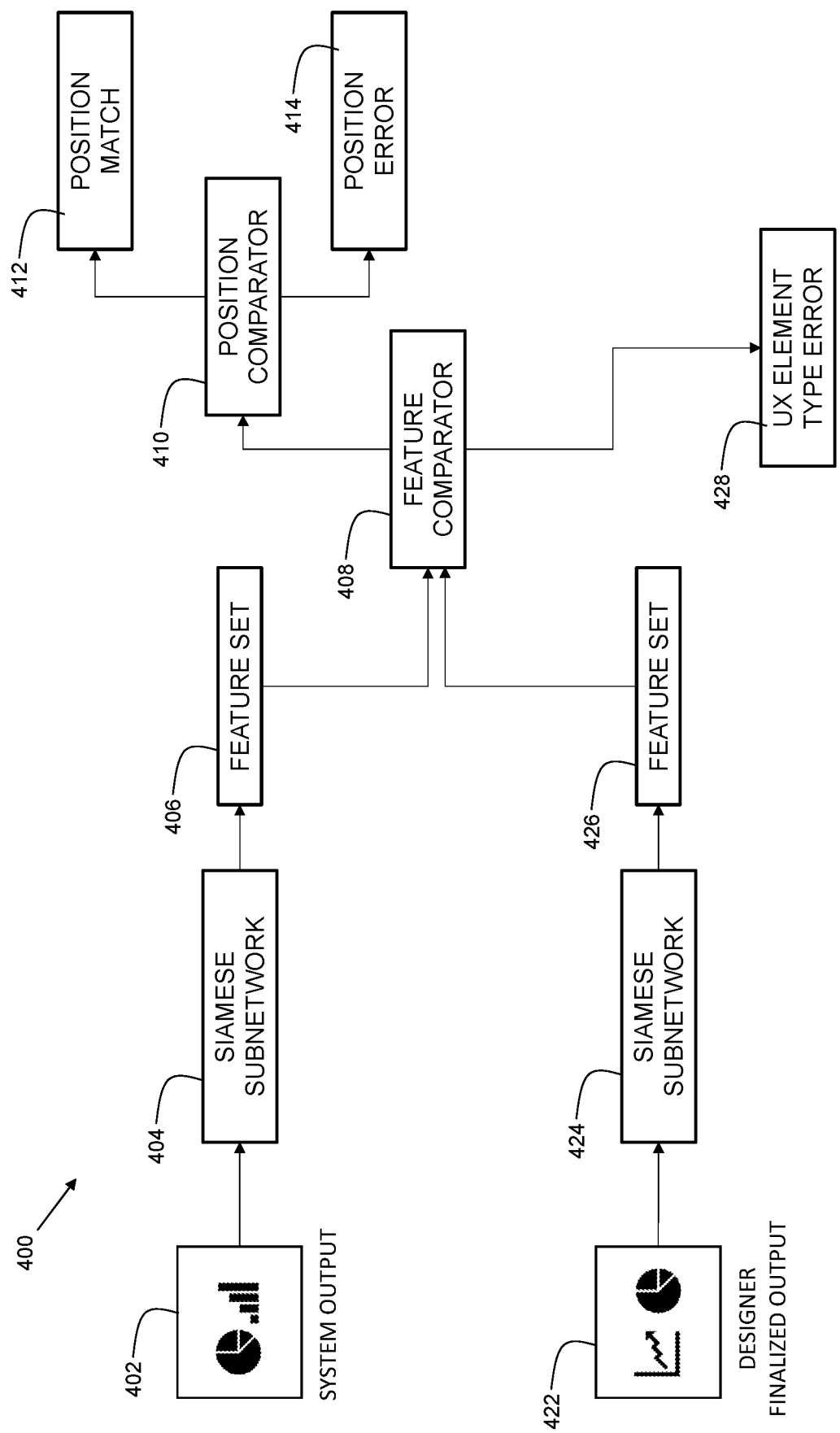
FIG. 4 is a flowchart indicating process steps for feature comparison in accordance with embodiments of the present invention.

FIG. 4 is a flowchart 400 indicating process steps for feature comparison in accordance with embodiments of the present invention. A UX mockup system output 402 is input to a first Siamese subnetwork at 404. A UX mockup designer finalized output 422 is input to a second Siamese subnetwork at 424. A Siamese Neural Network is a class of neural network architectures that contain two or more identical subnetworks, meaning that each subnetwork has the same configuration with the same parameters and weights. Parameter updating is mirrored across both subnetworks. It is used to find the similarity of the inputs by comparing its feature vectors, and in these embodiments, the inputs are UX mockups.

A first feature set 406 is output from Siamese subnetwork 404. A second feature set 426 is output from Siamese subnetwork 424. The first feature set 406 and second feature set 426 are input to a feature comparator 408. The feature comparator performs a comparison of the two feature sets (406 and 426). In embodiments, the feature comparator 408 performs a Euclidean distance computation to determine the similarity of the two feature sets. In some embodiments, the feature comparator 408 may utilize a Jaccard coefficient, Pearson coefficient, Tanimoto coefficient, Cosine similarity, and/or other suitable techniques, instead of, or in addition to, the Euclidean distance computation.

In embodiments, the feedback input to the GAN includes a user experience element type error. In embodiments, the feedback input to the GAN includes a user experience element position error. In embodiments, the user experience element type error is based on a Euclidean distance computation. In embodiments, computing a user experience element position error comprises: inputting the plurality of user experience designs into a first Siamese subnetwork to identify a first plurality of user experience elements; inputting a designer finalized user experience design into a second Siamese subnetwork to identify a second plurality of user experience elements; identifying corresponding user experience elements within the first plurality of user experience elements and the second plurality of user experience elements; computing a distance between the corresponding user experience elements; and indicating the user experience element position error in response to the distance exceeding a predetermined threshold. The indicating can include sending a message via network 124.

If the feature comparator 408 computes a Euclidean distance exceeding a predetermined threshold, then a UX element type error is generated at 428. In embodiments, the user experience element type includes a graph type. The graph type can include, but is not limited to, pie chart, bar graph, line graph, scatter plot, and/or other suitable graph type. An example of a type error can be seen in FIG. 3, where element 314 of UX mockup 310 has no counterpart in UX mockup 320. If the feature comparator 408 computes a Euclidean distance at or below a predetermined threshold, then the locations of the feature in each feature set are input to a position comparator 410. If the positions are within a predetermined distance of each other, then it is deemed to be a position match at 412. If the positions exceed a predetermined distance of each other, then a position error is indicated at 414. An example of a position error can be seen in FIG. 3, where element 312 of UX mockup 310 has a counterpart at 324 in UX mockup 320. Both element 312 and element 324 are pie charts, but element 312 is on the left side of the UX mockup 310, whereas element 324 is on the right side of the UX mockup 320.

Figure 5E:
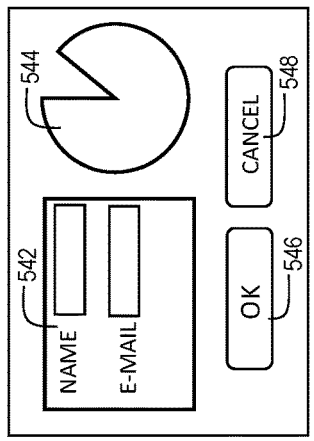
FIGS. 5B-5E are exemplary user experience mockup outputs in accordance with embodiments of the present invention.
Figure 5B:
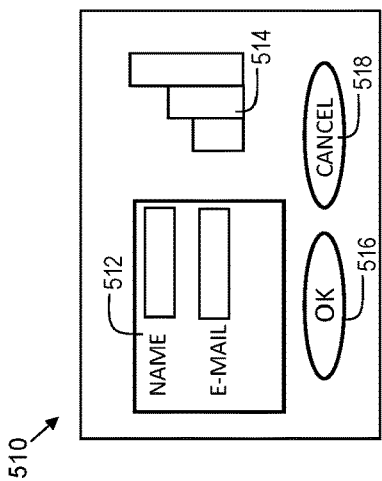
Figure 5D:
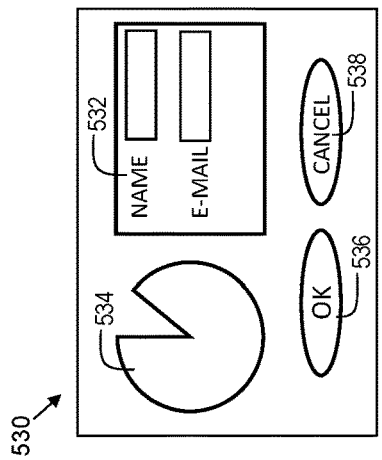
Figure 5A:
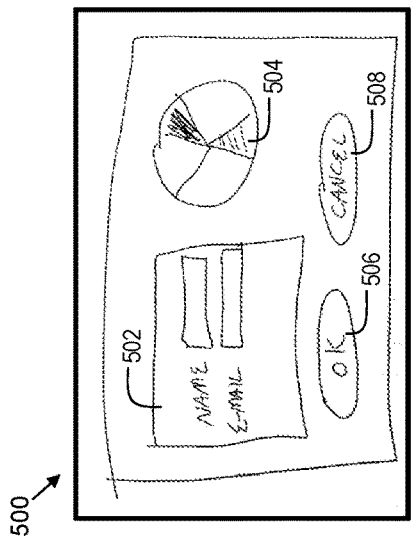
FIG. 5A is an exemplary user experience input sketch.

FIG. 5A is an exemplary user experience input sketch 500. Sketch 500 includes a text entry widget 502, a pie chart 504, an OK button 506, and a cancel button 508. This user experience input sketch may be used as input to an AUEMGS, similar to as shown at 168 in FIG. 1. Based on the input sketch, the AUEMGS can generate multiple user experience mockups.

Embodiments can include displaying the plurality of user experience designs on an electronic display device. FIGS. 5B-5E are exemplary user experience mockup outputs in accordance with embodiments of the present invention. The UX mockups are based on the input sketch 500 shown in FIG. 5A. Referring now to FIG. 5B, showing UX mockup 510, it has a text entry widget 512 on the left side, a bar graph 514 on the right side, an OK button 516, and a cancel button 518. The UX type and position match for the text entry widget 512, as compared to the input sketch 500 of FIG. 5A having text entry widget 502. However, there is a UX element type error with bar graph 514, which has no counterpart in input sketch 500.

Figure 5C:
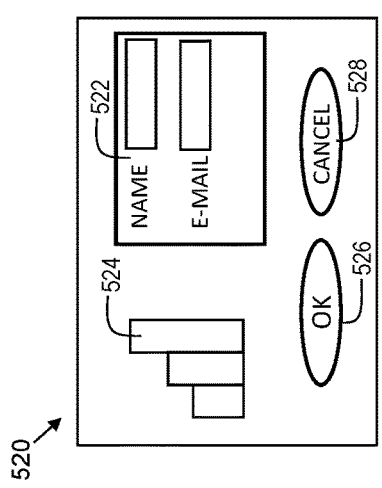

Referring now to FIG. 5C, showing UX mockup 520, it has a text entry widget 522 on the right side, a bar graph 524 on the left side, an OK button 526, and a cancel button 528. There is a UX position error for the text entry widget 522, as compared to the input sketch 500 of FIG. 5A having text entry widget 502. There is a UX element type error with bar graph 524, which has no counterpart in input sketch 500.

Referring now to FIG. 5D, showing UX mockup 530, it has a text entry widget 532 on the right side, a pie chart 534 on the left side, an OK button 536, and a cancel button 538. There is a UX position error for the text entry widget 532, as compared to the input sketch 500 of FIG. 5A having text entry widget 502. There is also a position error with pie chart 534, which is on the left side of UX mockup 530, as compared with pie chart 504, which is on the right side of input sketch 500.

Referring now to FIG. 5E, showing UX mockup 540, it has a text entry widget 542 on the left side, a pie chart 544 on the right side, an OK button 546, and a cancel button 548. The UX type and position match for UX element 542 and UX element 544, as compared with UX element 502 and UX element 504, respectively, of input sketch 500 in FIG. 5A.

An additional feature of disclosed embodiments is the application of thematic data from a theme description, such as shown at 270 of FIG. 2. As can be seen in sketch 500 of FIG. 5A, OK button 506 and cancel button 508 are drawn as ovals. Furthermore, in the UX mockups shown in FIG. 5B, FIG. 5C, and FIG. 5D, the OK and cancel buttons are also ovals. However, if the theme description indicates that buttons are more rectangular, then one such exemplary output that utilizes the thematic data is shown in FIG. 5E, where OK button 546 and cancel button 548 are rendered in a more rectangular style, as compared with OK button 536 and cancel button 538 of UX mockup 530 of FIG. 5D, as an example. Thus, disclosed embodiments can augment UX mockup outputs with thematic data obtained from a theme description that is input to the AUEMGS.

Figure 6:
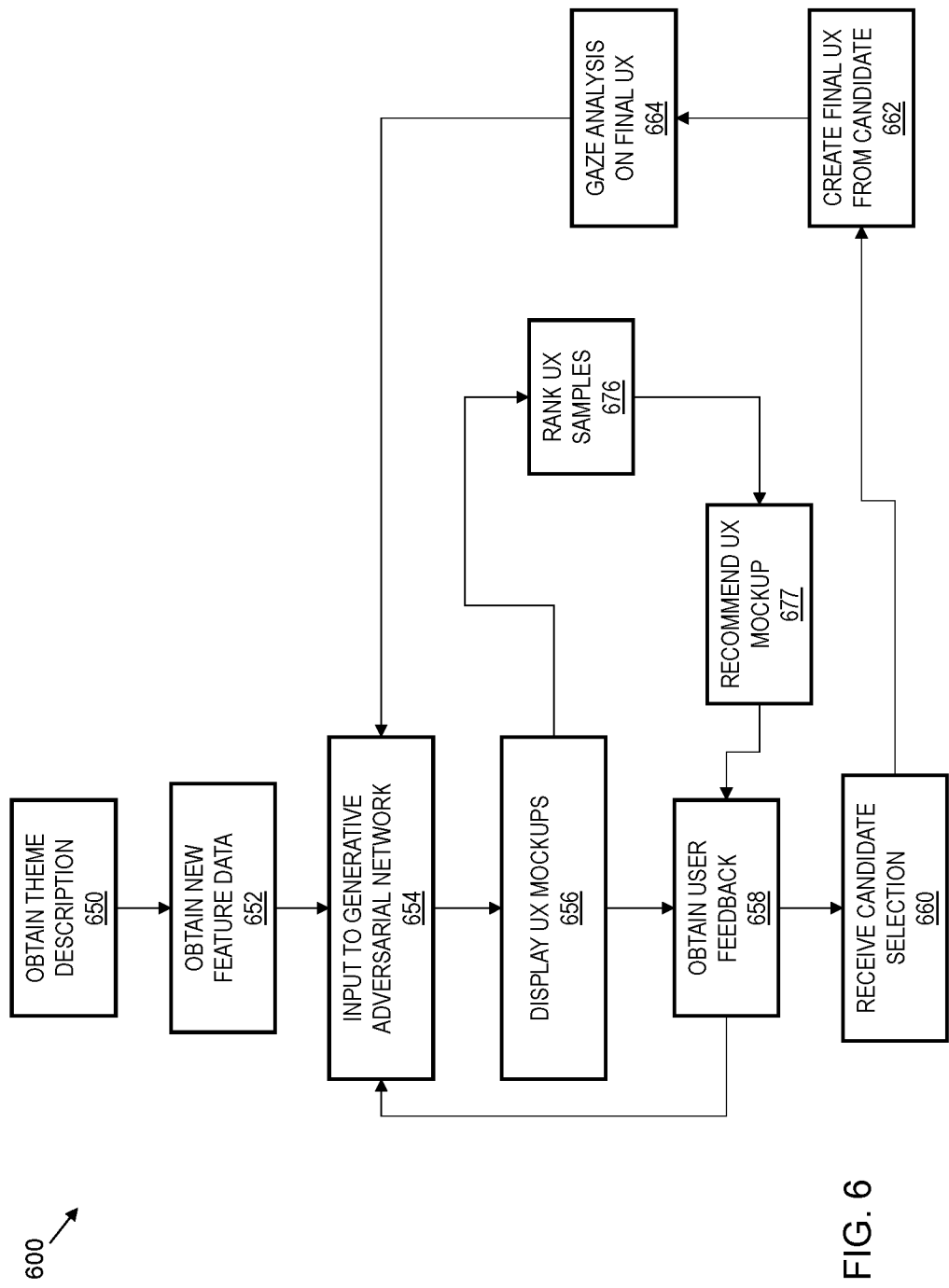
FIG. 6 is a flowchart indicating additional process steps for embodiments of the present invention.

FIG. 6 is a flowchart 600 indicating additional process steps for embodiments of the present invention. At 650, a theme description is obtained. In embodiments, the theme description can include data in an image format, such as a bitmap, XML (Extensible Markup Language) format, JSON (JavaScript Object Notation) format, YAML format, and/or other suitable format. At 652, new feature data is obtained. The new feature data can include graphical data such as images that have been processed by unstructured data conversion system 212, as well as generated images based on audio and/or text data processed by unstructured data conversion system 212. At 654, the new feature data is input to a generative adversarial network. The output of the generative adversarial network (GAN) includes one or more UX mockups that are displayed at 656. In embodiments, the UX mockups are displayed in a gaze-based feedback generation system such as depicted in FIG. 3.

Optionally, the one or more UX mockups can be ranked at 676. The ranking can be based on the number of UX element type errors, and/or UX position errors, with UX mockups that have the fewest errors getting the highest rankings. In some embodiments, as shown at 677, the UX mockup having the highest ranking is recommended by the AUEMGS to a user for use as a starting point for creating a finalized UX design.

The flow continues to 658, where user feedback is obtained on the displayed UX mockups. In some embodiments, a user may indicate a 'like' or 'dislike' for each UX mockup via a user interface such as a mouse or touchscreen of an electronic device. At 660, a user selection for a best UX mockup candidate is received. The selection criteria can include the design that is closest to an original user-created design, and/or a design that is most aesthetically pleasing to a viewer. One of the key benefits of disclosed embodiments is that the AUEMGS can generate UX mockups that the designers may not have derived on their own. The designers may find that a computer-generated UX mockup is better than the designs they originally created. The candidate UX mockup can be used as a starting point to create a finalized UX mockup. The user may then edit the candidate UX mockup as needed to create a final UX mockup at 662. The editing can include adjusting positions, changing button styles, colors, font sizes, font types, and/or other user interface adjustments. Thus, using disclosed embodiments, a small UX design team can generate many UX mockups using computer-implemented techniques, enabling the small UX design team to be competitive with a larger UX design team.

The flow can continue to 664, where a gaze analysis is performed on the final UX mockup. In the gaze analysis, the finalized designed UX mockup may be compared to the system output UX mockup, as depicted in FIG. 3. Based on the gaze of the user, type and position errors are computed, and the errors are input back to the generative adversarial network to continue training it to refine results for future UX mockup generation. The flow depicted in FIG. 6 can be iterative, repeating multiple cycles until satisfactory UX mockup results are achieved.

As can now be appreciated, disclosed embodiments improve the technical field of user interface development for computer applications. A generative adversarial network, coupled with a gaze-based feedback generation system, provide rapid generation of viable UX mockup designs, greatly accelerating development of new features. This saves considerable time and cost as compared with current user interface modification techniques. By enabling features to roll out faster, disclosed embodiments improve the efficiency and reduce the cost of new feature development. The AUEMGS 102 (FIG. 1) may implement one or more of the processing steps described, and/or interface with external systems and/or services to orchestrate and/or coordinate flow of data between the systems and/or services in order to generate one or more UX mockup outputs to aid UX designers in rapid creating of effective user interface designs and user experiences.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
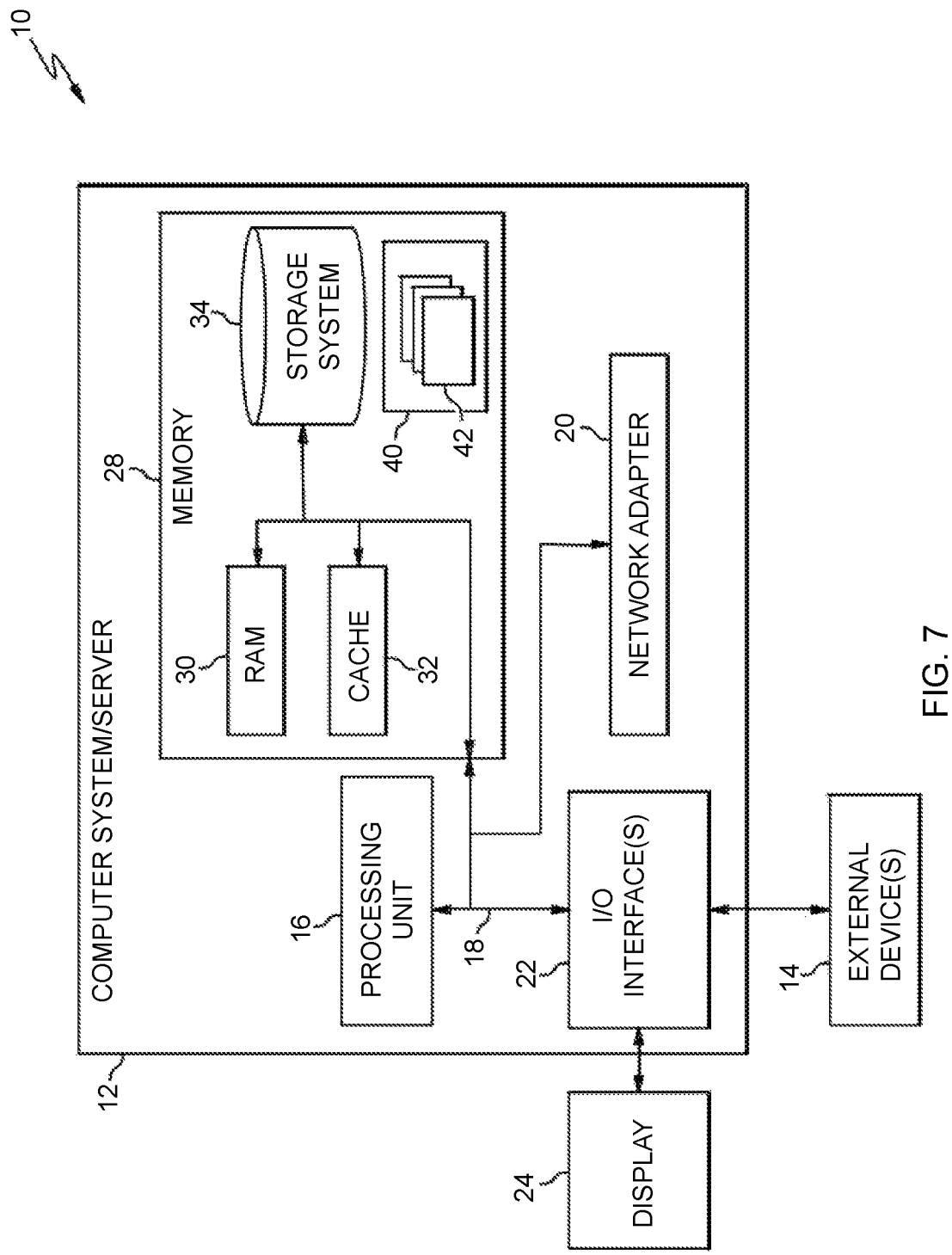
FIG. 7 depicts a cloud computing node according to an embodiment of the present invention.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

Computer system/server 12 typically includes a variety of computer system readable media. Such media may be any available media that is accessible by computer system/server 12, and it includes both volatile and non-volatile media, removable and non-removable media.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
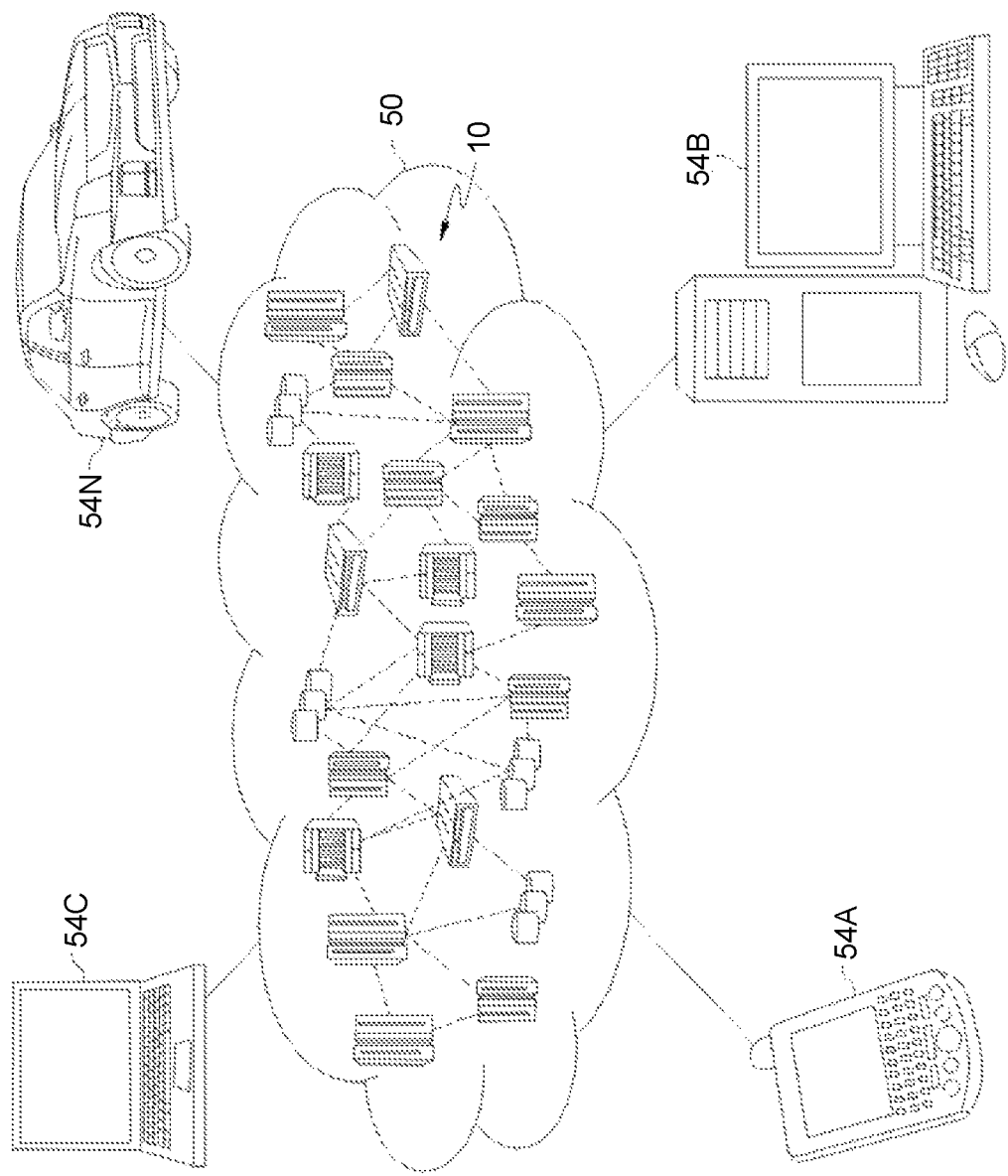
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
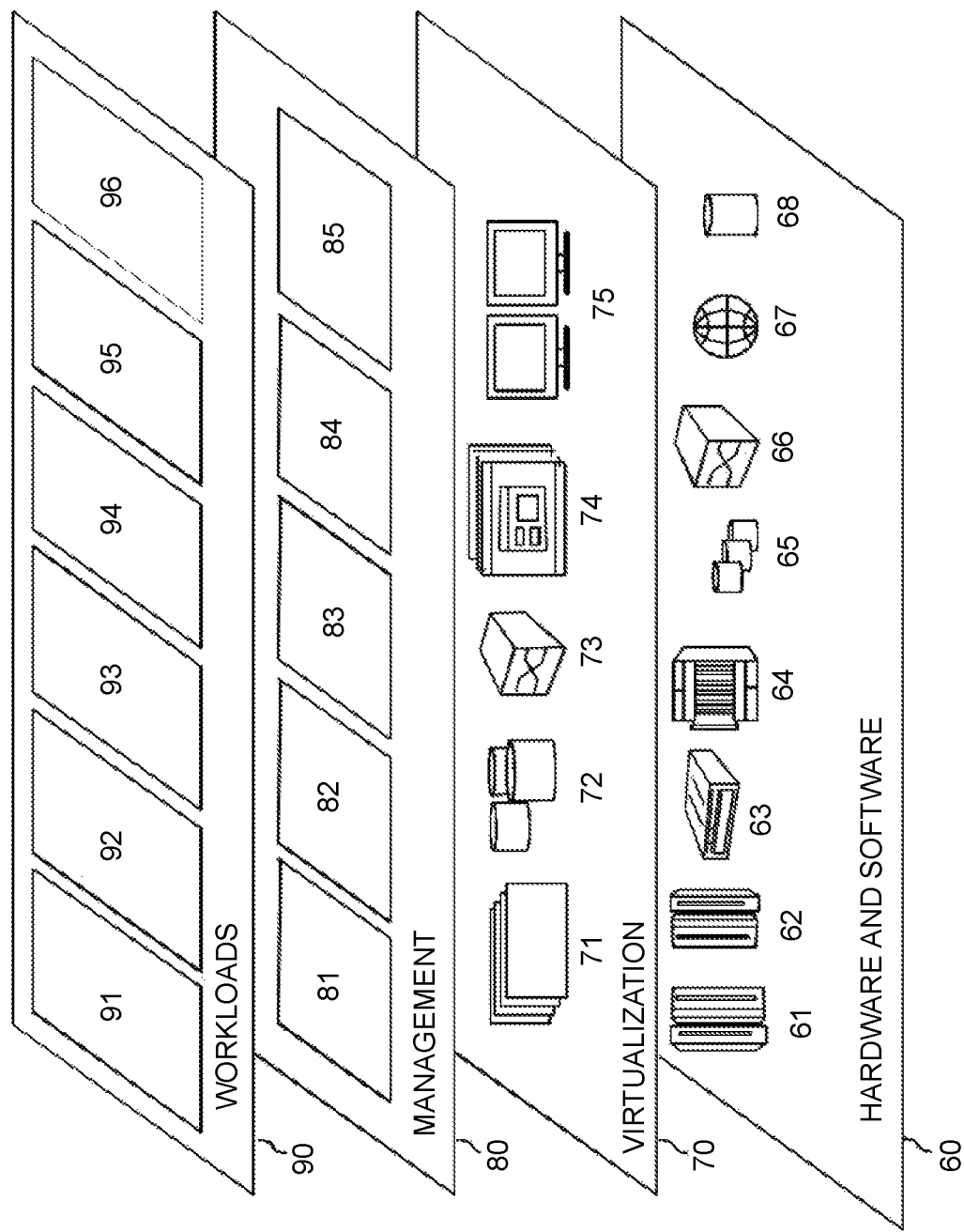
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated user experience mockup generation 96.

Implementations of the invention may include a computer system/server 12 of FIG. 7 in which one or more of the program modules 42 are configured to perform (or cause the computer system/server 12 to perform) one of more functions of the automated user experience mockup generation 96 of FIG. 9. For example, the one or more of the program modules 42 may be configured to: obtain data items from data sources; classify the data items into categories using a first machine learning (ML) model; generate a risk score of a first data center based on the classified data items and using a second machine learning (ML) model; determine the risk score of the first data center exceeds a threshold; and in response to the determining the risk score of the first data center exceeds the threshold, initiate a migration of the first data center to a second data center.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automated user experience mockup generation, comprising:
    obtaining a user experience theme description;
    obtaining a new feature image set;
    generating a plurality of user experience designs corresponding to the new feature image set by performing an iterative process using a generative adversarial network (GAN) based on the theme description and the new feature image set;
    sequentially displaying, using an electronic display device, the plurality of user experience designs to a user and tracking an eye gaze of the user with respect to a display of the plurality of user experience designs and determining where on the electronic display the user is viewing the user experience designs of the plurality of user experience designs;
    for the user experience designs of the plurality of user experience designs, identifying a corresponding set of user interface elements based on the eye gaze, wherein the corresponding set of user interface elements identified is a set of elements that are gazed at for a duration exceeding a predetermined threshold duration;
    comparing the identified corresponding set of user interface elements to a designer created user experience design; and
    returning the user interface elements of the identified corresponding set of user interface elements as feedback input to the GAN.

2. The method of claim 1, further comprising:
    obtaining an audio recording of a meeting;
    performing speech-to-text on the audio recording to generate a transcript;
    performing natural language processing on the transcript to generate user experience attributes; and
    wherein the returning the user interface elements of the identified corresponding set of user interface elements is based on inputting the user experience attributes into the GAN.

3. The method of claim 1, further comprising:
    obtaining a text document describing a user experience feature;
    performing natural language processing on the text document to generate one or more user experience attributes; and
    wherein the returning the user interface of the identified corresponding set of user interface elements is based on inputting the one or more user experience attributes into the GAN.

4. The method of claim 1, wherein the feedback input to the GAN includes a user experience element type error.

5. The method of claim 4, wherein the user experience element type error is based on a Euclidean distance computation.

6. The method of claim 4, wherein the user experience element type error is associated with a user experience element type that includes a graph type.

7. The method of claim 1, wherein the feedback input to the GAN includes a user experience element position error.

8. The method of claim 7, wherein computing the user experience element position error comprises the comparing the identified corresponding set of user interface elements to the designer created user experience design by:
    inputting the plurality of user experience designs into a first Siamese subnetwork to identify a first plurality of user experience elements;
    inputting the designer created user experience design into a second Siamese subnetwork to identify a second plurality of user experience elements;
    identifying corresponding user experience elements within the first plurality of user experience elements and the second plurality of user experience elements;
    computing a distance between the corresponding user experience elements; and
    indicating the user experience element position error in response to the distance exceeding a predetermined threshold.

9. The method of claim 1, further comprising:
    ranking the plurality of user experience designs;
    identifying a user experience design from the plurality of user experience designs as having a highest rank; and
    selecting the identified user experience design as a starting point for creating a finalized user experience (UX) design.

10. The method of claim 1, wherein the theme description includes a button shape.

11. The method of claim 1, wherein the new feature image set is obtained by:
    obtaining a hand-drawn image set; and
    converting the hand-drawn image set to an XML file.

12. An electronic computation device comprising:
    a processor;
    a memory coupled to the processor, the memory containing instructions, that when executed by the processor, cause the electronic computation device to:
    obtain a user experience theme description;
    obtain a new feature image set;
    generate a plurality of user experience designs corresponding to the new feature image set by performing an iterative process using a generative adversarial network (GAN) based on the theme description and the new feature image set;
    sequentially display, using an electronic display device, the plurality of user experience designs to a user and track an eye gaze of the user with respect to a display of the plurality of user experience designs on the electronic display device and determining where on the electronic display the user is viewing for the user experience design of the plurality of user experience designs;
    for the user experience design of the plurality of user experience designs, identify a corresponding set of user interface elements based on the eye gaze, wherein the corresponding set of user interface elements identified is a set of elements that are gazed at for a duration exceeding a predetermined threshold duration;
    comparing the identified corresponding set of user interface elements to a designer created user experience design; and return the user interface elements of the identified corresponding set of user interface elements that were identified based on the eye gaze as feedback input to the GAN.

13. The electronic computation device of claim 12, wherein the memory further comprises instructions, that when executed by the processor, cause the electronic computation device to:
    obtain an audio recording of a designer meeting;
    perform speech-to-text on the audio recording to generate a transcript;
    perform natural language processing on the transcript to generate user experience attributes; and
    return the user interface elements of the identified corresponding set of user interface elements based on inputting the user experience attributes into the GAN.

14. The electronic computation device of claim 12, wherein the memory further comprises instructions, that when executed by the processor, cause the electronic computation device to:
    obtain a text document describing a user experience feature;
    perform natural language processing on the text document to generate one or more user experience attributes; and
    return the user interface elements of the identified corresponding set of user interface elements based on inputting the one or more user experience attributes into the GAN.

15. The electronic computation device of claim 12, wherein the memory further comprises instructions, that when executed by the processor, cause the electronic computation device to generate a user experience element type error based on a Euclidean distance computation.

16. The electronic computation device of claim 12, wherein the memory further comprises instructions, that when executed by the processor, cause the electronic computation device to generate a user experience element position error by:
    inputting the plurality of user experience designs into a first Siamese subnetwork to identify a first plurality of user experience elements;
    inputting a designer finalized user experience design into a second Siamese subnetwork to identify a second plurality of user experience elements;
    identifying corresponding user experience elements within the first plurality of user experience elements and the second plurality of user experience elements;
    computing a distance between the corresponding user experience elements; and
    indicating the user experience element position error in response to the distance exceeding a predetermined threshold.

17. A computer program product for an electronic computation device comprising a computer readable storage medium having program instructions embodied therewith, the program instructions executable by a processor to cause the electronic computation device to:
    obtain a user experience theme description;
    obtain a new feature image set;
    generate a plurality of user experience designs corresponding to the new feature image set by performing an iterative process using a generative adversarial network (GAN) based on the theme description and the new feature image set;
    track an eye gaze of a user with respect to a display of the plurality of user experience designs on an electronic display device;
    for the plurality user experience designs, identify a corresponding set of user interface elements based on the eye gaze, wherein the corresponding set of user interface elements identified is a set of elements that are gazed at for a duration exceeding a predetermined threshold duration;
    comparing the identified corresponding set of user interface elements to a designer created user experience design; and
    return the user interface elements of the identified corresponding set of user interface elements that were identified based on the eye gaze as feedback input to the GAN of the identified corresponding set of user interface elements.

18. The computer program product of claim 17, wherein the computer readable storage medium includes program instructions executable by the processor to cause the electronic computation device to:
    obtain an audio recording of a designer meeting;
    perform speech-to-text on the audio recording to generate a transcript;
    perform natural language processing on the transcript to generate user experience attributes; and
    return the user interface elements of the identified corresponding set of user interface elements based on inputting the user experience attributes into the GAN.

19. The computer program product of claim 17, wherein the computer readable storage medium includes program instructions executable by the processor to cause the electronic computation device to:
    obtain a text document describing a user experience feature;
    perform natural language processing on the text document to generate one or more user experience attributes; and
    return the user interface elements of the identified corresponding set of user interface elements based on inputting the one or more user experience attributes into the GAN.

20. The computer program product of claim 17, wherein the computer readable storage medium includes program instructions executable by the processor to cause the electronic computation device to generate a user experience element type error based on a Euclidean distance computation.

* * * * *